July 29, 1958    A. F. WILCOX    2,845,235
ELECTROMAGNETIC WIRE TENSION DEVICE
Filed June 25, 1954
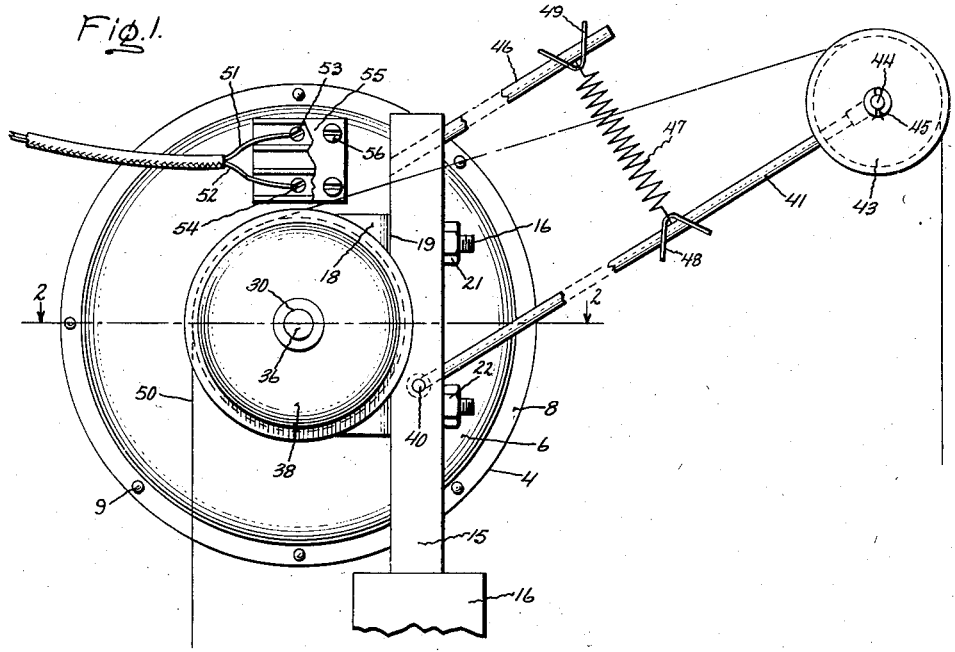
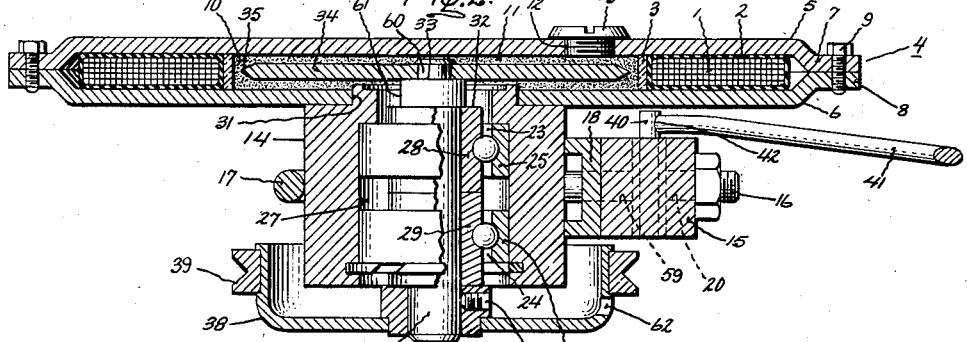
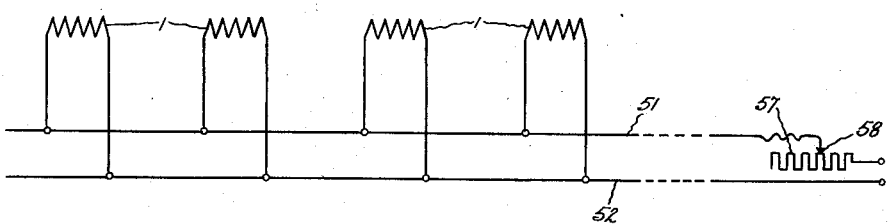
INVENTOR.
Albert F. Wilcox,
BY
His Attorney.

2,845,235

ELECTROMAGNETIC WIRE TENSION DEVICE

Albert F. Wilcox, Fort Wayne, Ind., assignor to General Electric Company, a corporation of New York Application June 25, 1954, Serial No. 439,250

2 Claims. (Cl. 242—155)

This invention relates to electromagnetic apparatus, and more particularly to an electromagnetic wire tensioning device.

In many devices formed of wire it is essential to the quality and effectiveness of the device that the wire be maintained at a predetermined and constant tension during the manufacturing process. This is particularly true where the wire is used in electrical apparatus, such as transformer coils and motor coils. In modern factories, it quite frequently occurs that there are several winding machines for forming the coils, all in operation at the same time. In order to achieve a constant quality, it is necessary that the wire be fed to the coil forming machine at the same unvarying tension for each machine. Since, when winding different coils, the tension requirements may vary, it is essential that in addition to means for maintaining all the different wires at the same tension there be provided a method of adjusting the wire tension. While there are many wire tensioning devices in existence the problems of a constant, but adjustable, tension for each, and of a uniform tension for all, have proved difficult to solve.

It will be seen from the foregoing that it is highly desirable to provide a simple and economical device which will put the wire fed to the winding machine under a predetermined tension. It is further desirable that it be possible to connect a plurality of such devices together so that the tension caused by each will be the same and so that they will be variable together. Such an arrangement would have the additional advantage that coils could be wound according to a specified tension instead of the wire tension depending upon the estimation of the machine operator, as is so often the case.

It is, therefore, an object of this invention to provide improved wire tensioning means embodying the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention, in one embodiment thereof, provides a coil, formed generally of copper or aluminum wire, and preferably surrounded with insulation. This coil, together with means made of magnetic material, form an enclosure within which a member of magnetic material is arranged to be rotatably mounted. A predetermined amount of magnetic material is loosely arranged within the enclosure with the rotatable member, which is arranged to be rotatable in response to the rotation of a pulley member adapted to receive wire on its way to be formed into the desired product. The coil is adapted to be connected to a source of electric current by a pair of electrical conductors, and a variable resistance may be placed in one of the conductors so that the amount of current supplied to the coil may be adjusted at will by adjustment of the resistance. When the rotation of the pulley causes the member to rotate, and the coil is energized, there will be created a magnetic flux which will pass through the enclosure and which, therefore, will magnetize the powder. The flux will, of course, also pass through the rotating member. The greater the current to the coil, the greater the magnetic flux linking the member, the casing, and the powder. It will be seen, therefore, that a braking effect is provided which is selectively variable in accordance with adjustments in the current supplied to the coil. In order to ensure that a plurality of such devices are operable to cause the same wire tension and to be varied together, it is merely necessary to make the dimensions of the devices the same, to provide the same quantity of powder in the space with the rotatable member, and to connect all the devices in parallel with each other across the electrical conductors from the current source.

In the drawing, Figure 1 is a side view, partly broken away, of the improved wire tensioning means of this invention;

Figure 2 is a cross-sectional view taken along line 2—2 of Figure 1; and

Figure 3 is a schematic illustration of a number of improved wire tensioning devices electrically connected in parallel.

Referring now to Figures 1 and 2 of the drawing, there is shown an annular electric coil 1, preferably made up of a number of turns of nonmagnetic electrically conductive copper or aluminum wire or bar, and enclosed in insulation 2. In addition to insulation 2, the inner surface of the coil is protected by an annulus 3 of nonmagnetic material which is also preferably non-conductvie where alternating current is used to energize coil 1. This annulus may be, for instance, of glass, but it is not objectionable to use conductive material such as aluminum or brass where the source of energization for coil 1 is direct current. Coil 1 is enclosed in a substantially annular casing portion 4 which is made up of two dish-shaped parts 5 and 6 of magnetic material each respectively having a peripheral annular flange 7 and 8. These flanges engage, as shown, around the entire periphery of casing portion 4 and are secured together by any desired means, such as bolts 9 extending through both flanges. The annular inner surface of coil 1 and members 5 and 6 together form a cylindrical enclosed chamber 10 within coil 1, and a predetermined amount of particles of magnetic material 11 such as, for instance, iron powder, may be introduced within the enclosure through an opening 12 which is then closed by a suitable plug 13. Casing portion 4 is firmly secured to a substantially cylindrical hub member 14 to complete the housing, or casing for the device. It is deemed preferable that casing portion 4 and hub member 14 be so arranged that when they are secured together, they are substantially concentric.

A rigid support member 15 is secured to a base 16 which may be, for instance, part of a winding machine, and casing member 14 may be secured to member 15 by means of a U-shaped bolt 16 which has a bight portion 17 extending around the periphery of hub member 14. U-shaped bolt 16 extends through openings 59 in a member 18 which has one surface thereof curved (not shown) to receive part of the periphery of hub member 14. The other surface of member 18 is substantially flat, as at 19, in order that it may lie against the side of member 15. When bolt 16 is fitted around casing member 14 through the openings 59 in member 18 and through openings 20 in member 15, a pair of nuts 21 and 22 may be threaded over the two ends of bolts 16 so that casing member 14 and casing portion 4 will be firmly secured to member 15 and base 16.

A pair of ball bearings 23 and 24 have their outer races 25 and 26 respectively secured within opening 27 inside hub member 14. The inner races 28 and 29 of bearings 23 and 24 respectively are arranged to rotatably support a shaft member 30 which extends through an opening 31 in member 6 and an opening 61 in hub member 14 into the enclosure 10. Shaft 30 may be provided with a shoulder 32 in order to secure bearings 28 and 29 against axial sliding. Secured to the end 33 of shaft 30 by any desired means, such as pin 60, there is provided a disc 34 formed of magnetic material substantially aligned with coil 1 and preferably so proportioned that there is a relatively small clearance between its tapered end 35 and annulus 3. Secured to the other end 36 of shaft 30, by means such as a screw 37 which bears against the surface of the shaft, there is a pulley member 38 provided with an annular peripheral V-shaped groove 39. Access to screw 37 may be had through opening 62 in member 38. It will be seen that the fastening of pulley 38 to shaft 30 will cause the pulley and the disc 34 to be rotatable together.

A pin 40 is pivotably mounted in member 15 and an elongated member 41 preferably of spring material is secured to pin 40 at 42. A pulley member 43 is rotatably mounted to member 41 by means of a pin 44 secured to the pulley, with any desired means such as cotter pins 45 being provided to prevent axial movement of the pin. A rigid member 46 is also secured to member 15, and a spring 47 is secured to member 41 by means of fixture 48 and to member 46 by means of fixture 49. The wire 50 which is to be tensioned is wound entirely around pulley 38 and then partly around pulley 43, as shown. It will be observed that members 46 and 41 and spring 47 avoid the possibility of undue tension in wire 50, and, in addition, they permit the pulley 43 to vibrate in harmony with the machine (not shown) on which the device of this invention may be mounted. It will be understood that member 41 may be rigidly secured to member 15 instead of pivotably as shown, and that the member 41 may be made of a spring material having the desired characteristics to replace the pivotal action of pin 40.

A pair of electric conductors 51 and 52 are connected to a power source (not shown) and to terminals 53 and 54 respectively. These terminals are mounted on casing 41 by means of a terminal block 55 which is secured to the casing portion 4 by means of screws such as 56. Terminals 53 and 54 extend through openings (not shown) in member 6 of casing portion 4, and are connected to the coil 1 so that it may be energized from the power source.

Referring now to Figure 3 of the drawing, conductors 51 and 52 are schematically represented. In line 51 there is provided a resistance 57 with a movable contact 58 so that the resistance in line 51 may be varied. A plurality of wire tensioning devices, as set forth in Figures 1 and 2, each have their coils 1 connected across lines 51 and 52.

Referring now to all the figures of the drawing, the operation of the improved wire tensioning device of this invention will be described. When wire 50 moves to rotate pulley 38, shaft 30 and disc 35 will also be rotated. So long as coil 1 is not energized through conductors 51 and 52, there will be only residual magnetism in the magnetic material of the disc 34 and of the casing portion 4, and disc 34 will rotate freely with pulley 38. When current is applied to coil 1 through leads 51 and 52 and variable resistance 57, a magnetic flux proportional to the current is set up in the magnetic material surrounding the coil. The flux will travel along member 5, through the powder of enclosure 10 and disc 35, back to the other member 6, and thence back to member 5. As is well known in the art, powder 10 when magnetized will form itself into chains linking the disc 34 to members 5 and 6. The strength of these chains will depend on the flux, which in turn depends on the amount of current used to energize coil 1. The undersirable possibility of the powder packing between annulus 3 and disc 34 is avoided by the tapered periphery 35 of the disc which acts as a knife edge to force the powder 10 off to each side. It will be seen that the linking of the disc 34 to members 5 and 6 by means of magnetized powder 10, will have the effect of braking the disc. This effect is variable by adjustment of the current through the coil 1. It will now be apparent by so adjusting the current through the coil 1, the amount of braking action on disc 34 and, consequently, on pulley 38, may be predetermined to an exact degree.

Referring now particularly to Figure 3, where there are shown a plurality of devices having their coils 1 connected in parallel across lines 51 and 52, it will be seen that by varying resistance 57, the current to each of the coils 1 may be varied. Thus, by constructing each of the devices in the same way, and by providing the same amount of magnetic material in the enclosure, it will be apparent that all of the devices can be controlled from a single point and that all of the devices will afford the same predetermined tension. No mechanical adjustment of any sort is necessary, and the single electrical adjustment will set all of the devices connected across the lines.

It has been found that while a variety of magnetic materials may be used within the enclosure in powdered form, pure powdered iron, is among the most satisfactory and is the most conducive to obtaining an exact and constant predetermined torque for a predetermined energization of the coil. It will also be understood that the coil may be wound for either alternating current energization or direct current energization. If direct current is used, a relatively large number of turns of relatively fine wire will be used, whereas if alternating current is used, there will be fewer turns of a larger wire.

While this invention has been explained by describing a particular embodiment thereof, it will be apparent that improvements and modifications may be made without departing from the scope of the invention as defined in the appended claims.

What I claim as new and desire to secure by Letters Patent of the United States is:

1. A wire tensioning device comprising a substantially annular coil, means adapted to connect said coil to an electric power source thereby to energize said coil, a housing comprising a casing portion of magnetic material extending around said coil, said casing portion and the inner surface of said coil forming a substantially disc shaped enclosure, a predetermined amount of magnetic powder loosely arranged within said enclosure, a disc shaped member of magnetic material within said enclosure, said member of magnetic material having a periphery tapered substantially to a knife edge, a shaft rotatably mounted within said housing, said member of magnetic material being secured to said shaft so as to be rotatable therewith, and a pulley member secured to said shaft so as to be rotatable therewith, said pulley member being adapted to be rotated by the wire to be tensioned, said coil being effective when energized to cause magnetic flux to pass through said casing portion and said enclosure whereby said powder tends magnetically to link said casing member to said rotatable member thereby to impede rotation thereof.

2. A wire tensioning device comprising a substantially annular coil of relatively fine electrically conductive nonmagnetic wire, means adapted to connect said coil to an electric power source thereby to energize said coil, said means including a variable resistance whereby the current to said coil can be adjusted, a substantially circular casing portion comprising a pair of dish-shaped members of magnetic material, said members being secured together to enclose said coil, said members and the inner surface of said coil forming a cylindrical enclosure, annular nonmagnetic nonconductive means arranged within said enclosure engaging the inner surface of said coil, a predetermined amount of iron powder loosely arranged within said enclosure, a substantially cylindrical hub portion secured to said casing portion and arranged substantially concentric therewith, said casing portion and said hub portion having aligned openings joining said enclosure and the interior of said hub portion, a disc of magnetic material arranged within said enclosure substantially concentric therewith, said disc having a periphery tapered substantially to a knife edge, a shaft rotatably mounted within said hub portion and extending into said enclosure at one end thereof and beyond said hub portion at the other end thereof, said disc being secured to said shaft so as to be rotatable therewith, and a pulley member secured to said other end of said shaft closely adjacent said hub portion so as to be rotatable therewith, said pulley member being adapted to be rotated by the passage thereover of wire to be tensioned, said coil being effective when energized by direct current to cause magnetic flux to pass through said first casing portion and said enclosure whereby said powder tends magnetically to link said first casing portion to said disc thereby to impede rotation thereof.

References Cited in the file of this patent

UNITED STATES PATENTS

| | | |
|---|---|---|
| 2,317,290 | McIlvried | Apr. 20, 1943 |
| 2,364,808 | Nelson | Dec. 12, 1944 |
| 2,586,037 | Heffelfinger | Feb. 19, 1952 |
| 2,605,875 | Stephenson | Aug. 5, 1952 |
| 2,607,542 | Spillman | Aug. 19, 1952 |
| 2,617,507 | Feiertag | Nov. 11, 1952 |
| 2,622,713 | Rabinow | Dec. 23, 1952 |
| 2,629,471 | Rabinow | Feb. 24, 1953 |
| 2,687,054 | Nelson | Aug. 24, 1954 |

FOREIGN PATENTS

| | | |
|---|---|---|
| 288,911 | Switzerland | June 1, 1953 |

OTHER REFERENCES

Technical Report 1213, National Bureau of Standards, Washington, D. C.

"The Magnetic Clutch," received U. S. Patent Office March 30, 1948. Copy available—Division 24.)